United States Patent [19]

Forrest, Jr.

[11] Patent Number: 4,679,283

[45] Date of Patent: Jul. 14, 1987

[54] DEVICE FOR BIAXIALLY STRETCHING FILM

[75] Inventor: Albert W. Forrest, Jr., Chillicothe, Ohio

[73] Assignee: E. I. Du Pont de Nemours and Company, Wilmington, Del.

[21] Appl. No.: 728,880

[22] Filed: Apr. 30, 1985

[51] Int. Cl.[4] .................. D06C 3/04; B29C 55/16
[52] U.S. Cl. ............................................ 26/73
[58] Field of Search ................ 26/73; 264/290.2; 74/191

[56] References Cited

U.S. PATENT DOCUMENTS 2,298,675 10/1942 Callender .................. 74/191 X R
2,674,203 4/1954 Bellah et al. .............. 74/191 X R

FOREIGN PATENT DOCUMENTS 5222669 6/1977 Japan ............................ 26/73
1013627 12/1965 United Kingdom ............ 26/73

Primary Examiner—Robert R. Mackey

[57] ABSTRACT

A device is disclosed for a variable speed carrier with power input from a chain drive to a sprocket on the carrier and power output to cones affixed to the sprocket and running on a pair of rails of variable spacing.

4 Claims, 7 Drawing Figures

DEVICE FOR BIAXIALLY STRETCHING FILM

BACKGROUND OF THE INVENTION

1. Field of the Invention

Linear motion, continuously variable, applied to a carrier provides transporting means with a capability of smooth acceleration and deceleration. Multiple carriers with a common power input provide transporting means without danger of collision between adjacent carriers. Such multiple carriers also provide means for stretching or compressing continuous lengths of material carried. A specific embodiment of such carriers finds use in the field of film stretching.

2. Discussion of the Prior Art

Mechanical devices useful for continuously stretching materials have long been sought, especially in the area of film web stretching and to the end of simultaneously stretching film webs in substantially perpendicular directions.

Japanese Laid-Open Publication No. 52-22669, published June 18, 1977, discloses a mechanical apparatus for stretching film by means of clips on rails whereby the clips are accelerated on the rails through a gear reduction with cog wheels of varying sizes in adjacent rack members.

U.S. Pat. No. 2,571,355, issued Oct. 16, 1951, discloses a device for two-way stretching of film wherein clips gripping the film are set to traverse grooves spiraled in corresponding faces of cones which have been situated apex-to-apex.

U.S. Pat. No. 3,248,753, issued May 3, 1966, discloses an alternative means for stretching film simultaneously and in perpendicular directions, utilizing directly-driven sprocket wheels of appropriate sizes with appropriate numbers of teeth.

SUMMARY OF THE INVENTION

The device of the present invention is a varying velocity carrier comprising a movable carrier body, a cone driver rotatably mounted on the carrier body and having a cone face, a stationary carrier body support means with track means on which the carrier body moves guiding the carrier body and rail means in contact with the cone face, and means for rotating the cone driver to move the carrier body on the track at a velocity which results from contact of the cone face with the rail means. When the rail means is out of parallel with the track means and still maintains contact with the cone face of a cone driver, the associated carrier body moves at a varying velocity relative to speed of rotation of the cone driver. The most usual operation of the carrier of this invention involves rotation of the cone driver and movement of the carrier body at varying velocities by virtue of a nonparallel spacing of the rail means from the track means.

BRIEF DESCRIPTION ON THE DRAWING

The invention will be further described in connection with the accompanying drawing, in which.

DETAILED DESCRIPTION OF THE INVENTION

A presently preferred use for the carrier of this invention is as a carrier for film clips in a thermoplastic film transporting and stretching device. The carrier may find use in other devices; and, while the invention herein is not limited to such use, description of the invention will be as it relates to cooperation of the several component parts of a film stretching device.

Figure 1:
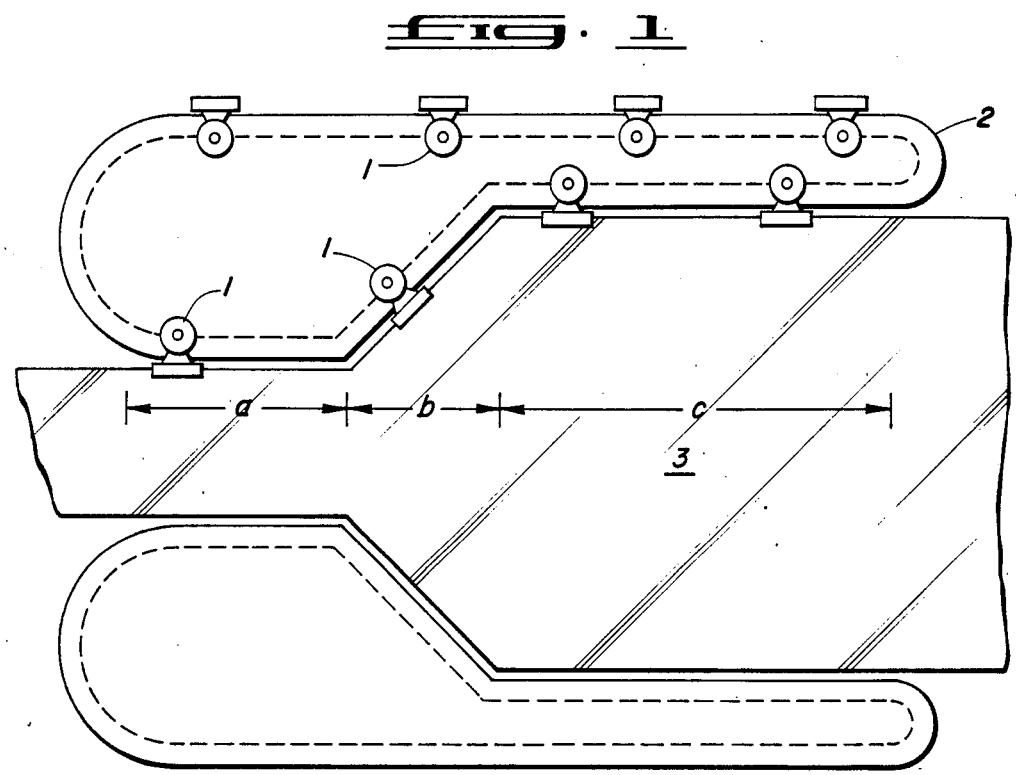
FIG. 1 is a representation of a thermoplastic film stretching device in which the present invention finds utility.

The transporting and stretching section of a film stretching device is shown in FIG. 1. In FIG. 1, several individual representations of the carrier 1 of this invention are shown around one of two mirror-image halves of tenter frame 2. A multitude of carriers 1 travel around each half of tenter frame 2 through which passes film web 3. Tenter frame 2 can be assembled to accommodate a variety of operational film stretching sequences. Tenter frame 2 in FIG. 1 is shown to have a web transporting and preheat section a, a primary stretching section b, and a secondary stretching section c. In preheat section a, a web 3 is introduced into tenter 2 and attached to film clips affixed to carriers 1, and web 3 is heated to stretching temperature as it traverses section a. From section a, the carriers 1 pass to section b where the sides of tenter 2 diverge and web 3 is stretched transverse to the direction of film travel and, by means of the present invention, can be also stretched longitudinally in the direction of film travel. In section c, web 3 can undergo, by means of the present invention, additional stretching longitudinally in the direction of film travel. Section c can, also, be used for cooling or heat setting or relaxing the web 3.

Figure 2:
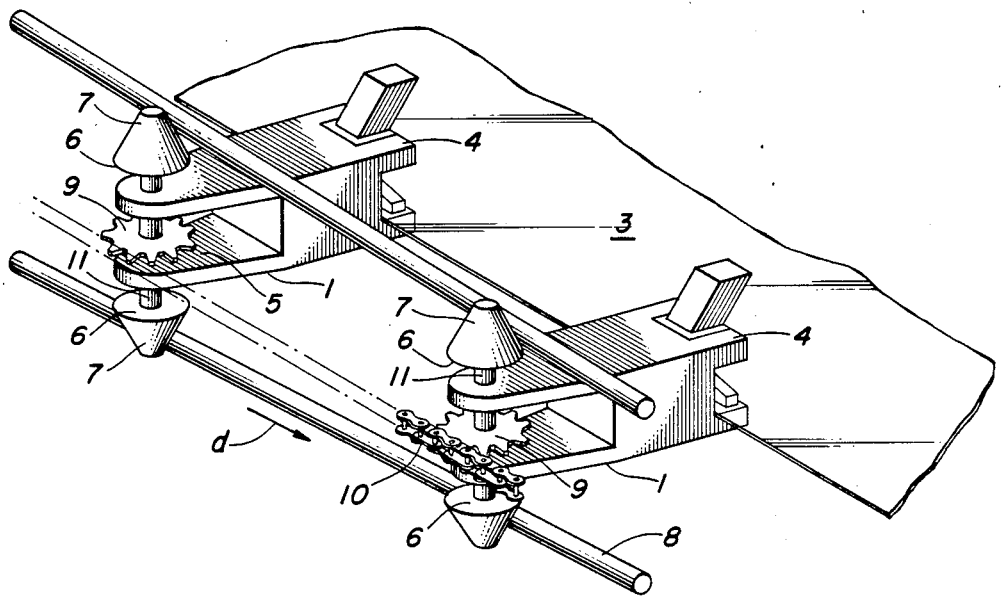
FIG. 2 is a partially-cutaway, perspective, representation of two of the carriers of this invention as they cooperate in operation as a film stretching device.

In FIG. 2, a section of a film stretching device is shown in perspective, in combination with two of the carriers 1. Carriers 1 have affixed thereto film clips 4 which grasp web 3 in a stretching process. FIG. 2 shows the carrier 1 with its movable carrier body 5, cone drivers 6 with cone faces 7, rails 8, sprockets 9, and driver chain 10. Driver chain 10 moves in direction d, engages sprockets 9, and moves carriers 1 in direction d at a speed relative to the speed of driver chain 10 and dependant on the points of contact between cone faces 7 and rails 8. In the most usual operation of this invention, chain 10 has a constant linear speed. Cones 6 and sprockets 9 are affixed on a shaft 11 rotatably mounted in carrier body 5. Cones 6 can be affixed to shaft 11 either in a base-to-base attitude or as apex-to-apex. Sprockets 9 can be toothed or smooth to operate with chains or belts. When rails 8 are spaced apart such that cones 6 contact the rails near the base of the cones, then drive chain 10 will cause carriers 1 to travel on rails 8 faster than when the cones contact the rails near the apex of the cones. As an example, when the circle of contact on cone 6 between rail 8 and the cone has the same diameter as the diameter of sprocket 9, then the velocity of carrier 1 will be one-half the velocity of driver chain 10.

The general formula for velocity of carrier 1 is as follows:

$$V = V_c \left( \frac{r_c}{r + r_c} \right)$$

wherein
V is the velocity of the carrier;
$V_c$ is the velocity of the drive chain;
r is the radius of the sprocket; and
$r_c$ is the radius of the circle generated
on the cone by contact with the rail.

The carriers, having cone drivers 6 with continuous cone faces 7, exhibit continuous change in velocity with continuous change in rail 8 spacing.

Figure 3:
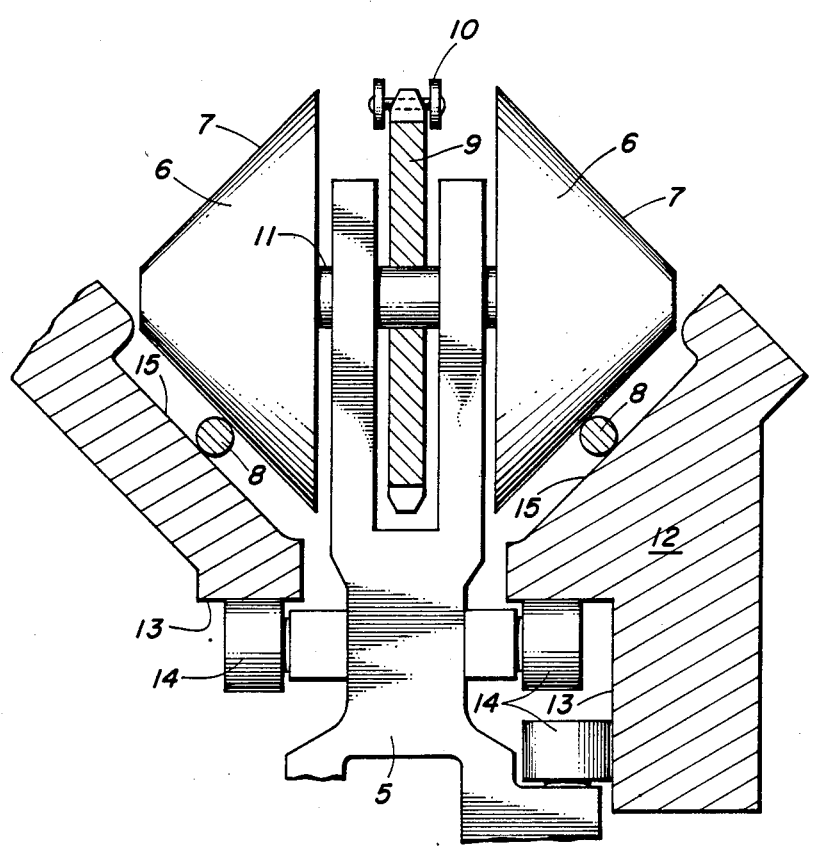
FIG. 3 is a representation of a twin-cone carrier of this invention.

A carrier 1 fitted with twin-cone drivers 6 is shown in FIG. 3. Movable carrier body 5 has shaft 11 rotatably mounted therein; and cone drivers 6 and sprocket 9 are affixed to shaft 11. Stationary carrier body support 12 (shown in FIG. 3, in section) includes track means 13 on which run rollers 14, rotatably mounted on movable carrier body 5. Rails 8 are adjustably located between the cone faces 7 of the cone drivers 6 and the support faces 15 of the carrier support 12. Adjustment of the location of rails 8, as stated above, causes adjustment of the velocity of the carrier 1. Carrier 1 is propelled by forces applied to sprocket 9 by drive chain 10 (shown in FIG. 3, on end, in section). Velocity of carrier 1 is adjusted by adjustment of the location of rails 8 on support faces 15;—care being taken to make the distances identical from the two cone-rail contact points to the center of shaft 11.

Figure 4:
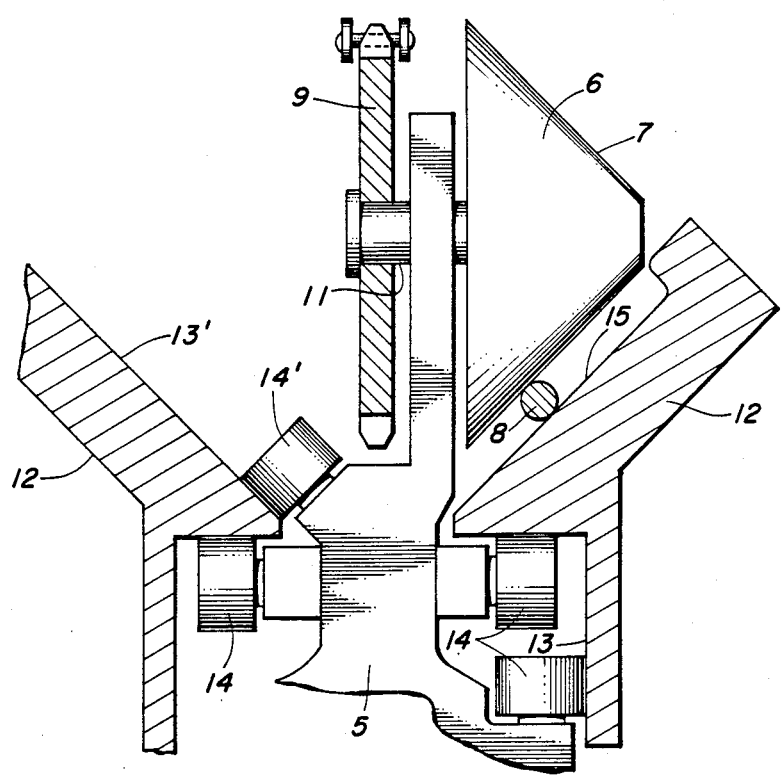
FIG. 4 is a representation of a single-cone carrier of this invention.

A carrier 1 fitted with a single cone driver is shown in FIG. 4. The carrier 1 of FIG. 4 is similar to the carrier 1 of FIG. 3;—equivalent elements having the same numbers. Use of only a single cone driver 6 causes substantial twisting force and, for that reason, increased stabilizing forces may be needed. On the other hand, a carrier with a single cone is not as sensitive to rail position due to its single point of rail contact and, thereby exhibits increased tracking stability. As an example of increased stabilizing forces, in FIG. 4, an additional roller 14' is mounted on carrier body 5 to be run against additional track means 13' on carrier support 12.

Figure 5:
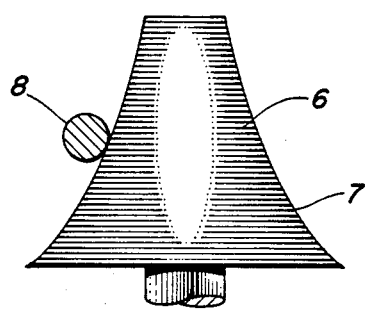
FIG. 5 is a concave cone shape for use in the carrier of this invention.
Figure 6:
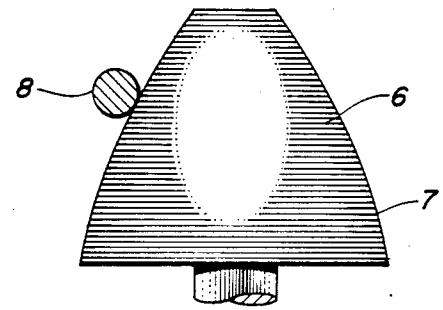
FIG. 6 is a convex cone shape for use in the carrier of this invention.
Figure 7:
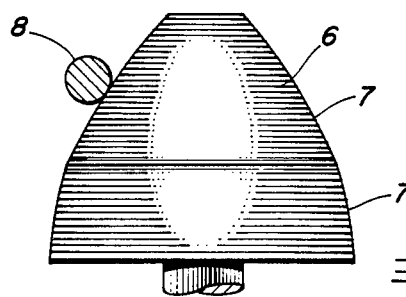
FIG. 7 is a compound cone shape for use in the carrier of this invention.

In using cones for driving the carriers of this invention, the carriers can exhibit continuous changes in velocity. Within the limits of the chain speed and the device geometry, any desired carrier velocity can be obtained by adjusting the location of contact between the rail and the cone face. With reference to FIGS. 3 and 4, as rails 8 are adjusted up support faces 15 and away from carrier bodies 5, the velocity of the carriers 1 is decreased relative to the velocity of sprockets 9 as driven by chains 10. Adjustment down support faces 15 and toward carrier bodies 5, of course, increases the velocities of carriers 1. When cone drivers 6 are right cones with flat cone faces 7, straight, parallel, rails 8 cause carriers 1 to move at constant velocity. Cone drivers 6 can be made with curved faces 7 such as will form a concave outline (FIG. 5), a convex outline (FIG. 6), or a complex combination of such outlines (FIG. 7). Such curved outlines for cone drivers 6 causes a varying acceleration or deceleration used with straight rails 8. Of course, the same effect can be achieved by using right cones and curved rails. Care must be exercised to maintain cone faces 7 as a smooth shape so that variations in velocity will be smooth and continuous rather than jerky and discontinuous.

I claim:

1. In a device for stretching film simultaneously in two directions composed of a tenter frame with film clips to grip the edges of a continuous web of film, wherein the film clips are affixed to varying velocity carriers, and wherein the sides of the tenter frame diverge to stretch said web of film transversely in the direction of film travel and simultaneously stretching the film longitudinally in the direction of film travel by acceleration of the film between said carriers, said varying velocity carriers each comprising a movable carrier body and a stationary support therefor composed of track means in which the carrier body can move and rail means out of parallel with said track means, the improvement comprising at least one conical driver within said carrier body adapted to contact said rail means and means for rotating said driver, said conical driver adapted to move said carrier body along said track means at a velocity dependent upon the point of contact of the face of said driver with said rail means.

2. The carrier of claim 1 wherein the conical driver is a right cone.

3. The carrier of claim 1 wherein the conical driver has a conical face with a concave outline.

4. The carrier of claim 1 wherein the conical driver has a conical face with a convex outline.

* * * * *